US005297464A

United States Patent [19]

Mayer

[11] Patent Number: 5,297,464

[45] Date of Patent: Mar. 29, 1994

[54] ROTARY SHEARS

[75] Inventor: Adolf Mayer, Magstadt, Fed. Rep. of Germany

[73] Assignee: Reinhardt Machinenbau GmbH, Sindelfingen, Fed. Rep. of Germany

[21] Appl. No.: 910,276

[22] PCT Filed: Feb. 8, 1991

[86] PCT No.: PCT/EP91/00237

§ 371 Date: Jul. 17, 1992

§ 102(e) Date: Jul. 17, 1992

[87] PCT Pub. No.: WO91/12938

PCT Pub. Date: Sep. 5, 1991

[30] Foreign Application Priority Data

Feb. 20, 1990 [DE] Fed. Rep. of Germany ....... 4005271

[51] Int. Cl.[5] .......................... B23D 19/04; B26D 7/26

[52] U.S. Cl. ...................................... 83/499; 83/425.4; 83/503; 83/504; 83/508.2; 83/665

[58] Field of Search ................. 83/499, 503, 504, 507, 83/425.4, 508.2, 508.3, 665

[56] References Cited

U.S. PATENT DOCUMENTS

| | | | |
|---|---|---|---|
| 2,239,623 | 4/1941 | Oster . | |
| 3,837,265 | 9/1974 | Tokuno | 83/665 X |
| 4,010,677 | 3/1977 | Hirakawa et al. | 83/499 X |
| 4,033,217 | 7/1977 | Flaum et al. | 83/499 X |
| 4,162,643 | 7/1979 | Coburn | 83/499 |
| 4,220,064 | 9/1980 | Potter | 83/665 X |
| 4,316,317 | 2/1982 | Ritzling | 83/499 X |
| 4,515,052 | 5/1985 | Flaum | 83/499 X |
| 4,516,454 | 5/1985 | Mosburger | 83/499 |
| 4,781,668 | 11/1988 | Mowry | 83/499 X |
| 4,843,933 | 7/1989 | Seki et al. | 83/499 X |
| 4,922,778 | 5/1990 | Nagai | 83/503 X |
| 4,926,730 | 5/1990 | Garrett | 83/499 |
| 5,074,180 | 12/1991 | Mayer et al. | 83/508.2 X |
| 5,099,734 | 3/1992 | Sugiyama et al. | 83/499 X |

FOREIGN PATENT DOCUMENTS

| | | |
|---|---|---|
| 20619 | 5/1883 | Fed. Rep. of Germany . |
| 2711328 | 9/1977 | Fed. Rep. of Germany . |
| 2006246 | 4/1989 | Spain . |

OTHER PUBLICATIONS

"Maschinenmarkt", 1989, pp. 18-21.

Lockmann, Hans Werner "Fachberichte Huttenpraxis Metallweiterverarbeitung," 1978, pp. 652 to 656.

*Primary Examiner*—Rinaldi Rada

*Attorney, Agent, or Firm*—Shenier & O'Connor

[57] ABSTRACT

Rotary shears for dividing sheet steel strips for sheet steel panels into several bands including a machine frame, two blade shafts rotatably mounted in a machine frame at an adjustable distance apart and at least one of which is driven, roller blades which can be positioned axially on the blade shafts, a manipulator which can slide on the machine frame parallel to the blade shafts and which positions the roller blades axially on the blade shafts and releasable clamps for clamping the roller blades on the blade shafts in predetermined positions. All roller blades can be positioned on the blade shafts individually and independently of each other by the manipulator and can be clamped on the blade shafts individually and independently of each other by the clamps.

11 Claims, 7 Drawing Sheets

ROTARY SHEARS

FIELD OF THE INVENTION

The invention relates to rotary shears for dividing sheet metal bands or sheet metal panels into several strips.

BACKGROUND OF THE INVENTION

In known rotary shears of this type (leaflet of the Fagor company from "MM Maschinenmarkt", No. 29/1989), each blade shaft is surrounded by a sleeve, on which the roller blades are axially positionable. The sleeve can be expanded due to hydraulic medium introduced between the blade shaft and the sleeve and this causes the roller blades to be clamped on the blade shaft. This has the disadvantage that all the roller blades are always either clamped on the blade shaft or displaceable thereon when unclamped. It must therefore be feared, in particular, that when a roller blade is positioned, it will alter its position again, for example due to vibrations of the machine, so that, finally, exact distances between the roller blades cannot be set. Moreover, the manipulator of the known rotary shears is designed such that the roller blades of the lower blade shaft can be adjusted only by taking along the roller blades on the upper blade shaft and the manipulator, when the roller blades on the upper blade shaft are to be adjusted individually, must perform a lifting movement in order to get free of the roller blades of the lower blade shaft. This means that the positioning of the roller blades on their blade shafts is time-consuming and complicated.

SUMMARY OF THE INVENTION

The object of the invention is to improve rotary shears of the generic type such that the positioning of the roller blades on their blade shafts can be carried out quickly and simply by the manipulator and the roller blades can no longer leave the positions they have taken up as long as additional roller blades are being adjusted on the blade shaft.

BRIEF DESCRIPTION OF THE DRAWINGS

The following description of preferred embodiments of the invention serves to explain the invention in greater detail in conjunction with the attached drawings. In the drawings.

DESCRIPTION OF THE PREFERRED EMBODIMENT

Figure 1:
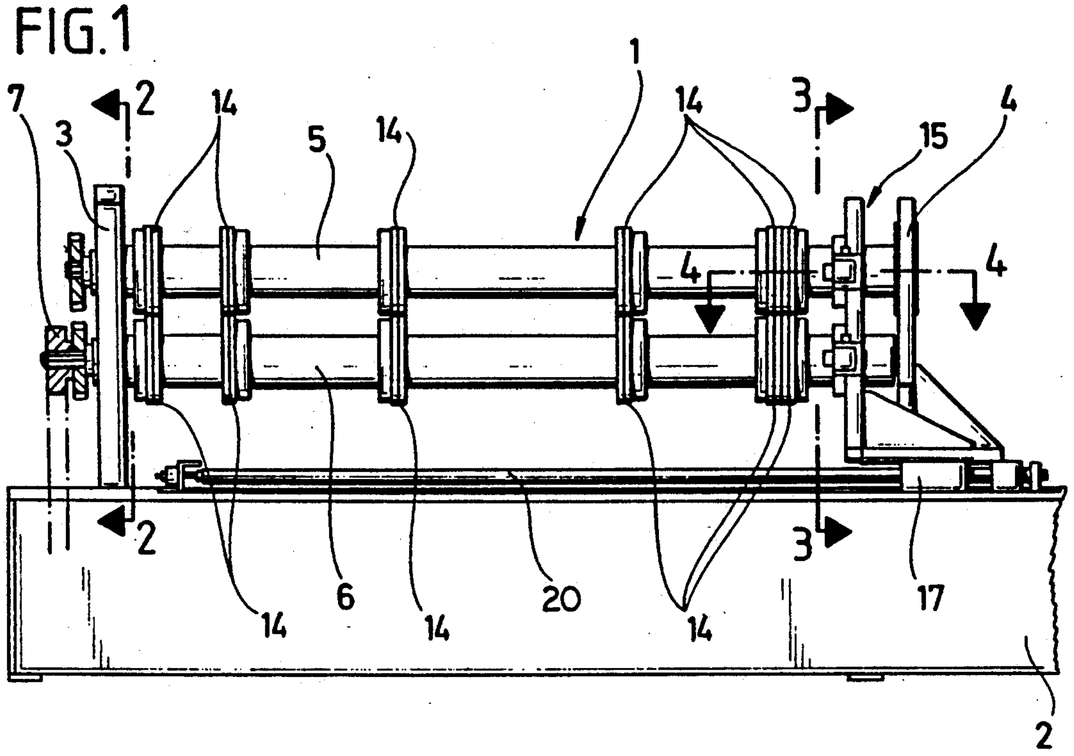
FIG. 1 is a schematic front view of rotary shears.

The rotary shears 1 illustrated schematically in FIG. 1 comprise a machine frame 2 with two blade shafts 5, 6 rotatably mounted in stands 3, 4 of this frame. The blade shafts are adjustable relative to one another in a manner to be described so that the distance between them can be set. The (in FIG. 1) lower blade shaft 6 is drivable directly via a drive pulley 7 in the known manner by a motor (not illustrated) which is mounted in the machine frame 2.

Figure 2:
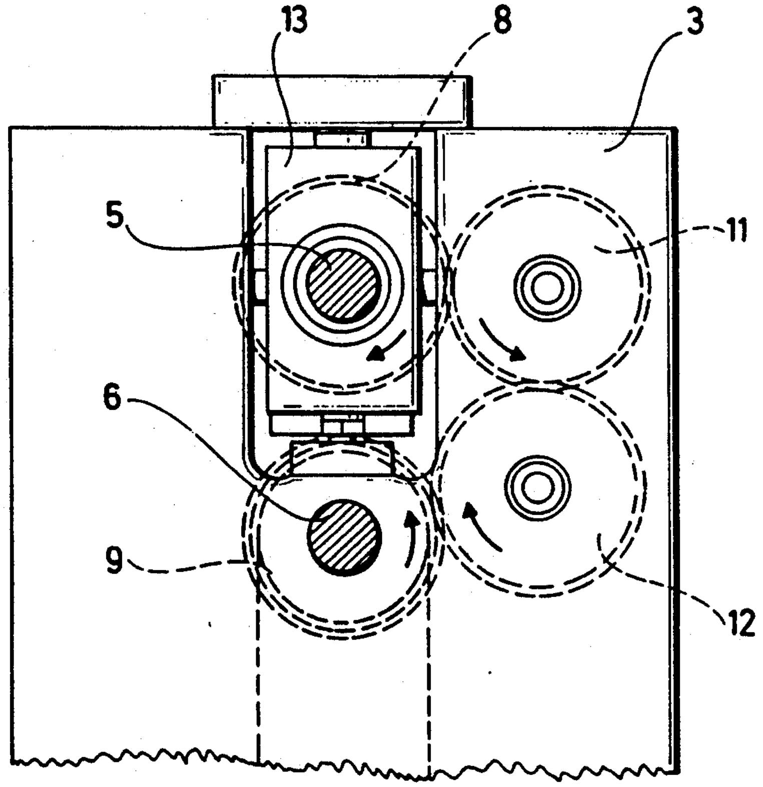
FIG. 2 is a sectional view along line 2—2 in FIG. 1.

As shown in FIG. 2, gear wheels 8 and 9 are seated in the region of the stand 3 on the blade shafts 5 and 6, respectively. These wheels are connected in the manner of gears by additional gear wheels 11, 12 mounted on the stand 3 such that when the lower blade shaft 6 is driven via the drive pulley 7 the upper blade shaft 5 is taken along in the opposite direction of rotation. As also shown in FIG. 2, the upper blade shaft 5 is vertically displaceable in the stand 3 by means of a carriage 13 so that the relative distance to the lower blade shaft 6 can be adjusted. The same applies for the stand 4, in which the upper blade shaft 5 is also mounted for adjustment by means of a carriage. The displacement of the upper blade shaft 5 by the specified carriages 13 is so slight that the gear wheels 8, 11 do not become disengaged and therefore can always drive both blade shafts 5 and 6.

Roller blades 14 are arranged on the blade shafts 5 and 6 and these rotate together with the blade shafts. The roller blades can be positioned and clamped in a manner still to be described on the blade shafts 5, 6 in a desired manner. Since the roller blades of one blade shaft are very closely adjacent to those of the other blade shaft in their end position, the two blade shafts 5 and 6 are moved away from one another in the described manner during the positioning of the roller blades on their blade shafts. Once positioning has finished, the two blade shafts 5, 6 are brought closer together again.

Four roller blades 14, located to the left in FIG. 1, are arranged on their blade shafts 5, 6 in pairs and located opposite one another so that a sheet metal band of corresponding width or a sheet metal panel of corresponding width can be divided into three strips of differing widths, the width of the strips corresponding each time to the distance between the roller blades 14 on their blade shafts 5, 6. The two roller blades 14 arranged on the blade shafts 5, 6 and located to the far right in FIG. 1 are not in operation. They can be put into operation when, for example, a sheet metal band is to be divided into more than three strips.

Figure 3:
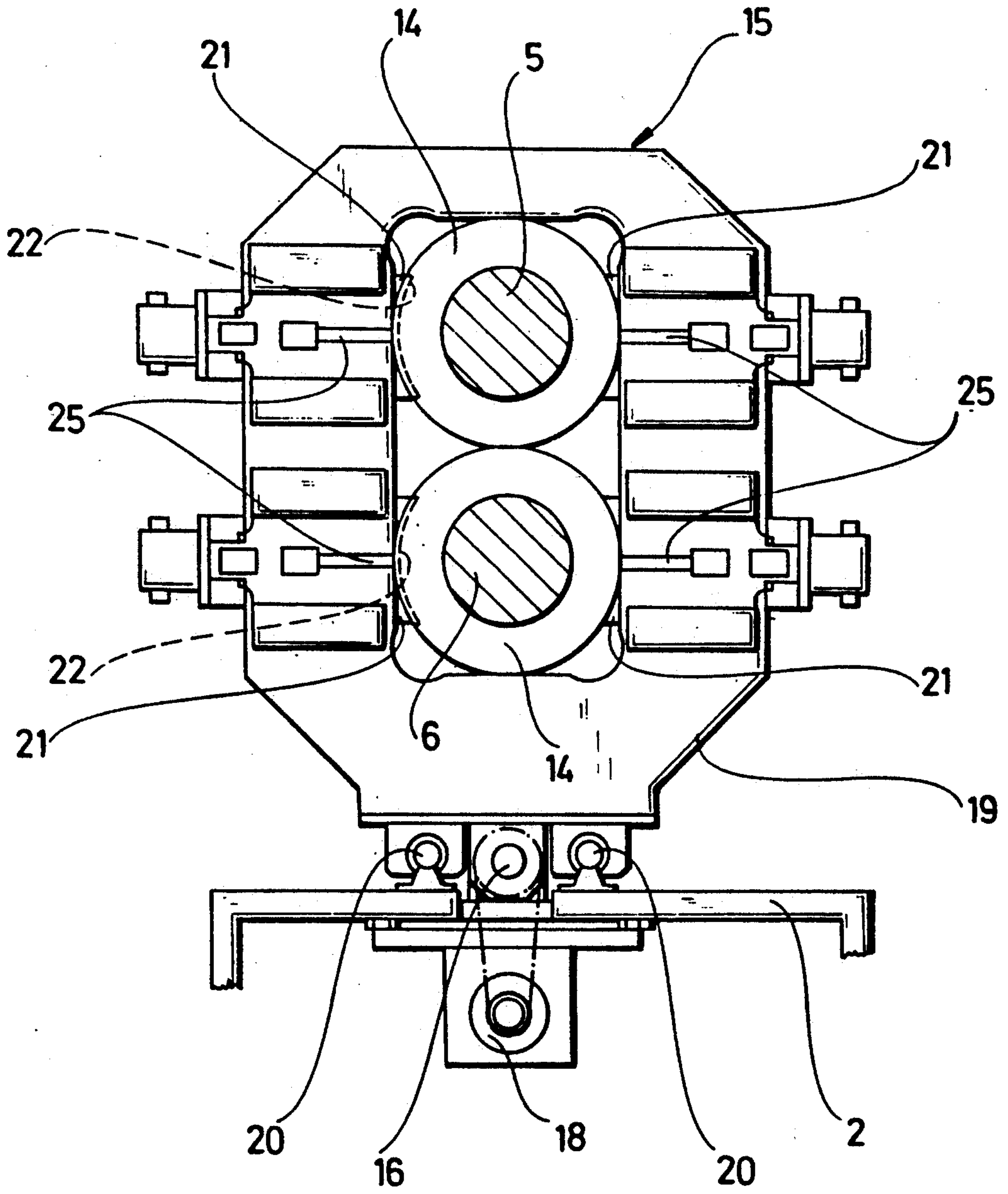
FIG. 3 is a sectional view along line 3—3 in FIG. 1.

The rotary shears 1 also comprise, as likewise shown in FIG. 1, a manipulator 15, with the aid of which the roller blades 14 can be positioned and clamped on their blade shafts 5, 6 individually and independently of one another. The manipulator is displaceable back and forth with the aid of a sliding guide means 20, which runs horizontally along the machine frame 2, over the entire axial length of the blade shafts 5 and 6 and parallel thereto. The manipulator 15 is driven via a screw spindle 16 which engages in a corresponding nut 17 of the manipulator 15. The screw spindle 16 is, as shown in FIG. 3, drivable by a motor 18 arranged in the machine frame 2 alternatively in either direction of rotation. In FIG. 3, the specified sliding guide means 20, on which the manipulator 15 is displaceable, is also indicated schematically.

Figure 4:
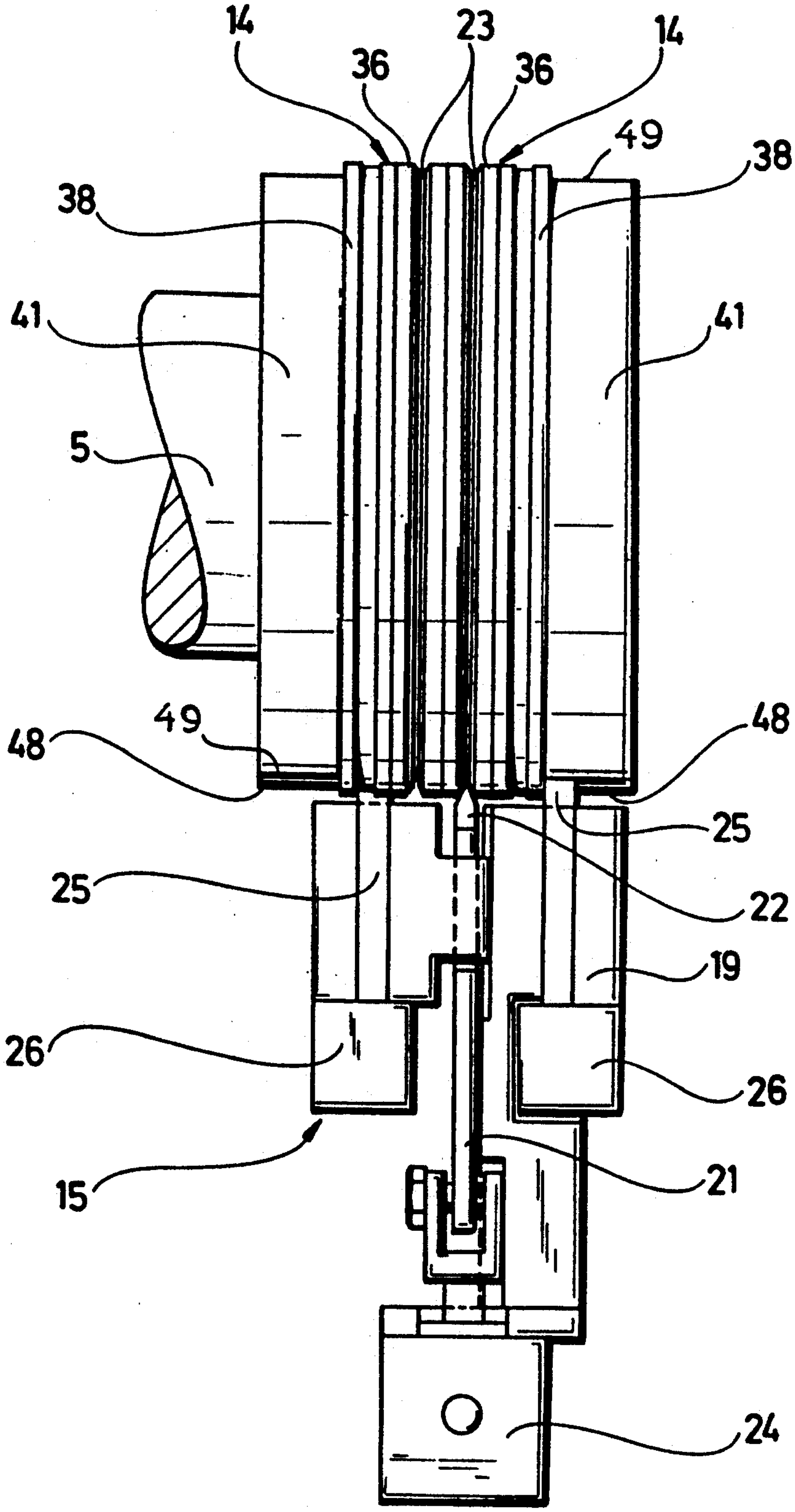
FIG. 4 is a schematic plan view of a manipulator with associated roller blade according to line 4—4 in FIG. 1.

The manipulator comprises a frame 19 which encloses both blade shafts 5, 6 and the roller blades 14 seated thereon in a ring-like manner. As shown in FIGS. 3 and 4, a total of four slides 21 are provided in pairs in the frame 19 of the manipulator 15. These slides have concavely curved edges 22 with which they can engage positively and free from play in corresponding grooves 23 of the roller blades 14. Two oppositely located slides 21 are associated each time with a blade shaft 5 or 6 and the roller blades 14 arranged thereon. The slides 21 are mounted in the frame 19 for horizontal displacement and can be shifted by remote-controlled hydraulic or pneumatic cylinders 24 such that their edges 22 either engage in the grooves 23 of the roller blades 14 or are withdrawn out of them. When the slides 21 engage with their edges 22 in the grooves 23 of the roller blades 14, the roller blades are taken along during displacement of the manipulator 15 and displaced on their blade shafts 5, 6. A prerequisite for this is that clamping means, which are still to be described and are operative between the blade shafts and the roller blades, are released. When the slides 21 are withdrawn with their edges 22 out of the grooves 23 of the roller blades, the manipulator 15 can move freely past the roller blades 14.

Fingers 25 are also mounted in the frame 19 of the manipulator 15 for displacement on both sides of the slides 21. These fingers can be moved forward or withdrawn relative to the roller blades 14 by remote control with the aid of working cylinders 26. These fingers 25 serve in a manner still to be described to actuate the clamping means, with the aid of which the roller blades 14 can be clamped on their blade shafts 5, 6 or released therefrom.

Figure 5:
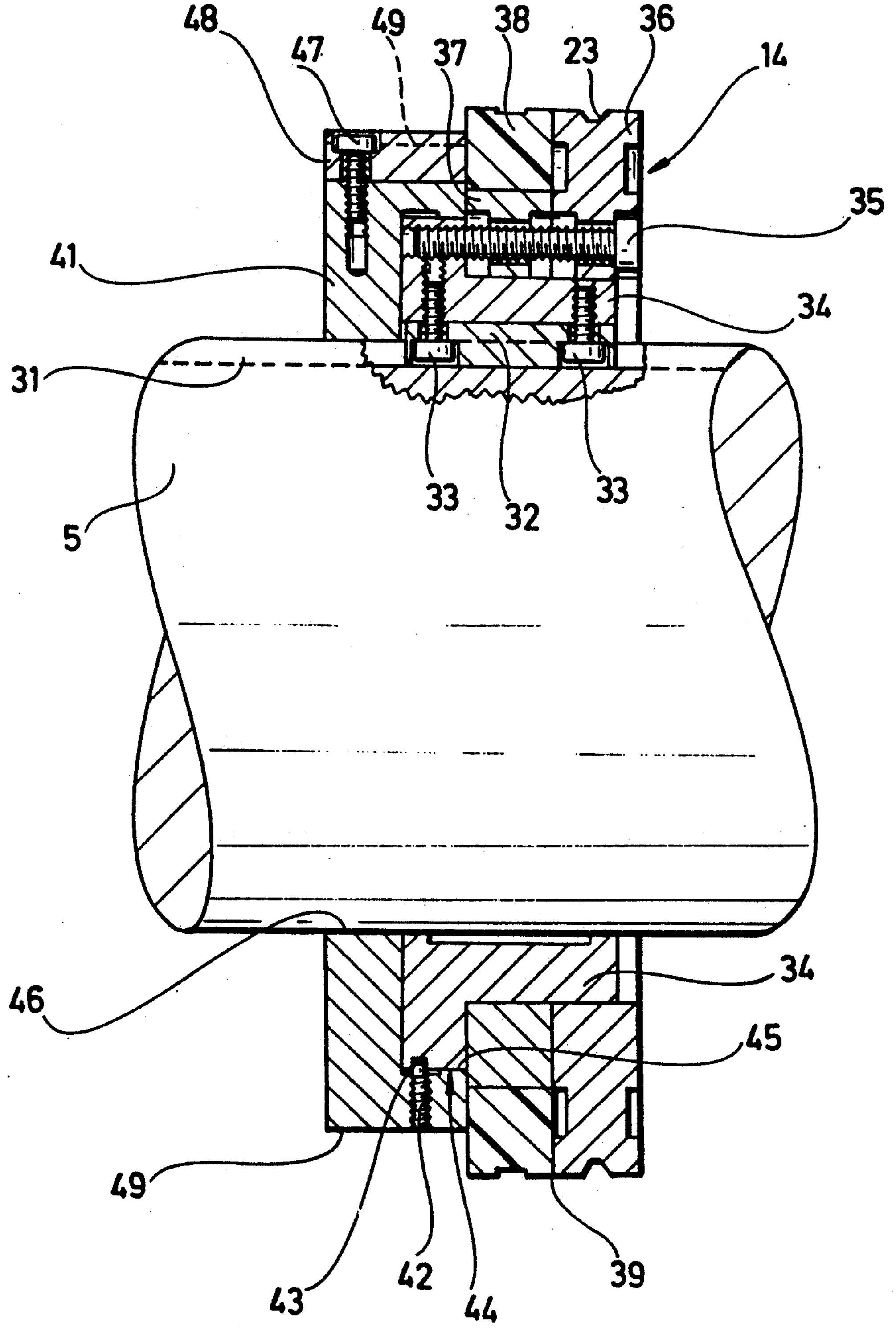
FIG. 5 is an axial sectional view of a mechanical roller blade clamping means.

FIG. 5 shows the construction of a roller blade 14 in a first embodiment comprising mechanically operating clamping means. An axial groove 31, which is open to the outside, is formed in the outer side of the blade shaft 5 (the same applies for the blade shaft 6) and an adjusting spring 32 is displaceable in this groove. The adjusting spring 32 is rigidly connected by screws 33 to a hub member 34 surrounding the blade shaft 5. In this way the hub member 34 is held on the blade shaft 5 so as to be non-rotatable but axially displaceable.

A blade member 36 comprising the specified groove 23 as well as a lifting member 37 are rigidly connected to the hub member 34 by screws 35. The lifting member 37 is, for its part, surrounded by a lifting ring 38 which can consist of resilient plastic and the outer circumferential surface of which extends essentially flush with the outer circumferential surface of the blade member 36. The actual cutting edge of the blade member 36 is designated in FIG. 5 by the reference numeral 39. Blade member 36 and lifting member 37 with the lifting ring 38 are therefore arranged on the blade shaft 5, together with the hub member 34, so as to be non-rotatable but axially displaceable on this shaft.

As also shown in FIG. 5, the blade shaft 5 is surrounded by a ring member 41 which partially covers the hub member 34. The ring member 41 is freely rotatable on the blade shaft 5. A threaded pin 42 which engages in a corresponding annular groove 43 of the hub member 34 prevents any axial movement of the ring member 41 relative to the hub member 34 and therefore ensures the unity of these two parts. The outer circumferential surface 44 of the hub member 34 and the inner circumferential surface 45 of the ring member 41 covering this surface 44 lie eccentrically to the central axis of the blade shaft 5. Consequently, the hub member 34 and with it the entire roller blade 14 can be clamped on the blade shaft 5 due to corresponding rotation of the ring member 41 on the blade shaft 5. When the ring member 41 is rotated relative to the blade shaft 5 in the opposite direction of rotation, the roller blade 14 is released from the blade shaft 5 so that it is displaced axially on the latter and can be positioned. The inner circumferential surface 46, with which the ring member 41 is seated on the blade shaft 5, is designed to be circular-cylindrical and concentric to the central axis of this shaft.

Stop blocks 48 are attached to the outer circumference of the ring member 41, sunk into corresponding axial grooves, with the aid of screws 47 at angular spacings of, for example, 60°. These blocks project beyond the outer circumferential surface 49 of the ring member 41 and with the protruding portion form stop surfaces for the fingers 25 of the manipulator 15 which have already been mentioned in conjunction with FIGS. 3 and 4. In FIG. 4, the stop blocks 48 are also drawn in with their radially directed stop surfaces. It is apparent in FIG. 4 how the finger 25 located to the right in this Figure abuts on the stop surface of the stop block 48 and hereby prevents any rotation of the relevant ring member 41 in a specific direction of rotation. The finger 25 located to the left in FIG. 4 is, on the other hand, withdrawn and therefore not in a position to butt on a stop block 48. As shown in FIG. 4, in addition, the two fingers 25 are each spaced from the slide 21 at such a distance that when the concave edge 22 of the slide engages in the groove 23 of a roller blade 14, a finger 25 can always engage on the stop block 48 of the ring member 41 associated with this blade. If, in FIG. 4, the slide 21 were to engage with its edge 22 in the groove 23 of the roller blade 14 located to the left, the finger 25 located to the left in this Figure could come into engagement with the stop block 48 of the left roller blade 14.

This means that all the roller blades 14 can be positioned by the manipulator 15 on their blade shafts 5, 6 individually and independently of one another in the following manner: When the blade shafts 5, 6 are suitably moved apart from one another (slide 13 in FIG. 2), the manipulator 15 will be moved forward in front of a specific roller blade 14 seated on the upper or lower blade shaft 5, 6, respectively. First of all, it is assumed that this roller blade is not clamped on its blade shaft. Then, the two slides 21 associated with the relevant blade shaft are moved forward such that they engage in the groove 23 of the roller blade 14. Subsequently, the roller blade 14 now taken along by the manipulator will be positioned at the desired place on the blade shaft due to corresponding, remote-controlled displacement of the manipulator on its sliding guide means with the aid of the screw spindle 16. After this, one of the fingers 25 will then be advanced in the manner apparent from FIG. 4. Then, the blade shaft is caused to rotate. One of the stop blocks 48 hereby comes into engagement with the advanced finger 25 so that the associated ring member 41 cannot be rotated further. A continued rotation of the blade shaft belonging to the ring member 41 now has the effect of automatically clamping the ring member 41 and, with it, the associated roller blade 14 on the blade shaft, due to the eccentricity, as described above, of the circumferential surfaces 44, 45 on the hub member 34 and the ring member 41, respectively. In order to release the roller blade 14 from its blade shaft, the opposite procedure is followed: The blade shaft is rotated in the opposite direction of rotation until the advanced finger 25 abuts on one of the stop blocks 48 so that the ring member 41 is rigidly held thereby. When the blade shaft is rotated further, the tension between ring member and hub member is then released so that the roller blade 14 can be axially displaced and positioned on its blade shaft.

The clamping means described in conjunction with FIG. 5 operate purely mechanically due to the eccentricity of the circumferential surfaces 44, 45 as described. In conjunction with FIGS. 6 and 7, clamping means will be described in the following which operate hydraulically.

Figure 7:
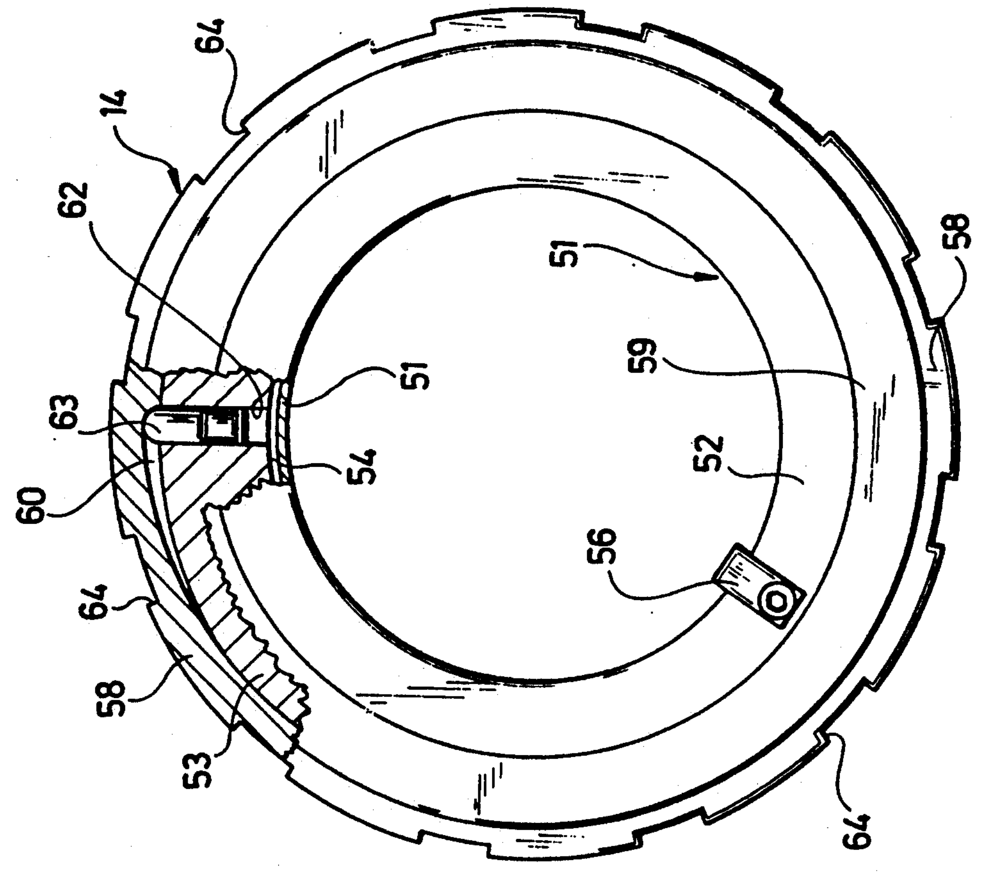
FIG. 7 is a front view of the clamping means of FIG. 6.
Figure 6:
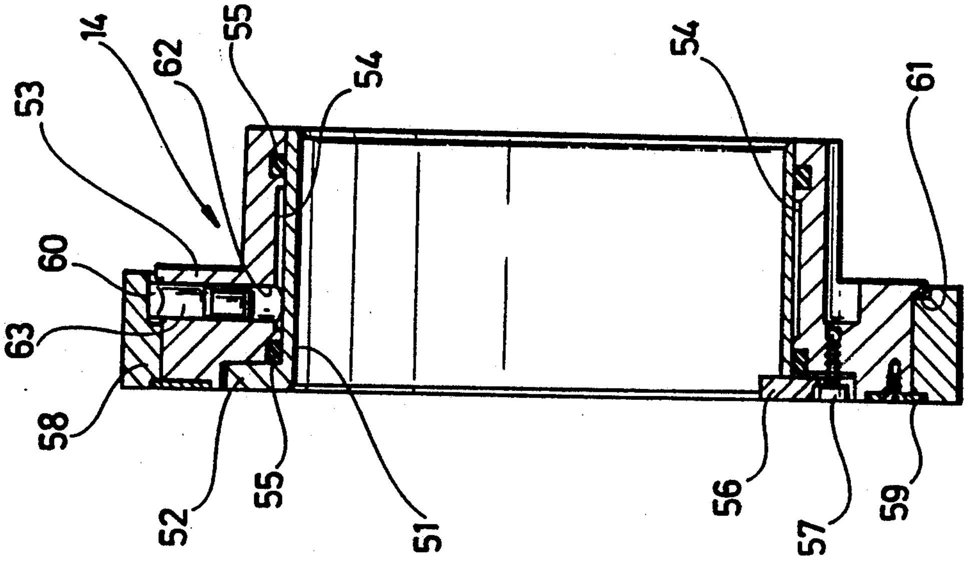
FIG. 6 is an axial sectional view of a hydraulic roller blade clamping means.

According to FIGS. 6 and 7, a roller blade 14 comprises a clamping sleeve 51 which encloses the associated blade shaft (not illustrated in FIGS. 6 and 7). The clamping sleeve 51 has on its one side an end wall 52 projecting radially from the blade shaft. A hub member 53 is pushed onto the clamping sleeve 51 and has in its inner circumferential surface facing the sleeve 51 a recessed annular space 54 filled with hydraulic medium. Sealing rings 55 are arranged on both sides of the annular space 54 between sleeve 51 and hub member 53. An adjusting spring 56, which is attached by a screw 57 to the end wall 52 of the sleeve 51 as well as to the hub member 53, protrudes into a corresponding groove extending axially on the outer side of the associated blade shaft. This groove corresponds to the groove 31 in FIG. 5. The adjusting spring 56 therefore holds clamping sleeve 51 and hub member 53 so as to be non-rotatable but axially displaceable on the blade shaft. A ring member 58 is seated for rotation on the outer circumferential surface of the hub member 53. This ring member is prevented from any axial displacement relative to the hub member 53 by a radially projecting ring 59 rigidly connected with the latter and by a step 61 in the hub member 53. The hub member 53 comprises radially extending bores 62 at angular spacings of, for example, 60°. These bores communicate with the annular space 54 and pistons 63 are slidingly displaceable therein in a sealed manner. The heads of the pistons 63 protrude beyond the circular-cylindrical, outer circumferential surface of the hub member 53. The bores 62 are, like the annular space 54, filled with hydraulic medium. When one or several of the pistons 63 are accordingly displaced radially inwards in the bores 62, the hydraulic pressure in the annular space 54 increases. The clamping sleeve 51 is consequently pressed together and clamped on the blade shaft it surrounds. Since the clamping sleeve 51 is rigidly connected with the hub member 53, the entire roller blade can, in this manner, be clamped in a desired position on the blade shaft.

As illustrated in FIG. 6, the hub member 53 comprises a stepped recess open to the right. The blade member 36 and a lifting member 37 with lifting ring 38 can be rigidly arranged in this recess in the manner apparent from FIG. 5 but not expressly illustrated in FIG. 6.

In order to move the pistons 63 in the hub member 53 radially inwards for increasing the hydraulic pressure in the annular recess 54, the ring member 58, as best apparent in FIG. 7, has inner surfaces 60 extending eccentrically in sections towards the central axis of the blade shaft such that when the ring member 58 is rotated accordingly (in FIG. 7 to the right) relative to the hub member 53 which is circular-cylindrical on its outer side, the inner spacing between inner surface 60 and hub member 53 becomes smaller which causes the piston 63 to be pressed inwards automatically in its bore 62 due to the inner surface 60 engaging on the piston head.

In order to be able to carry out this relative rotation between ring member 58 and hub member 53 automatically with the aid of the manipulator 15, recesses 64 with radial stop surfaces are provided in the outer side of the ring member 58 at specific angular spacings and one of the fingers 25 (FIG. 4) can be inserted therein. This prevents the ring member 58 from rotating further in a specific direction of rotation (in FIG. 7, for example, to the left). If the blade shaft and the hub member 53 non-rotatably connected therewith are now rotated further in the same direction of rotation, the piston 53 is displaced in its bore 62 due to the eccentric inner surface 60, as described, of the ring member 58 and due to the increase in the hydraulic pressure caused by this the arrangement is clamped on the blade shaft. If rotation takes place in the opposite direction, the piston 63 is displaced radially outwards due to the prevailing hydraulic pressure when hub member 53 and ring member 58 are rotated relative to one another and so the tension is released and the roller blade 14 can now be displaced axially on its blade shaft.

Figure 8:
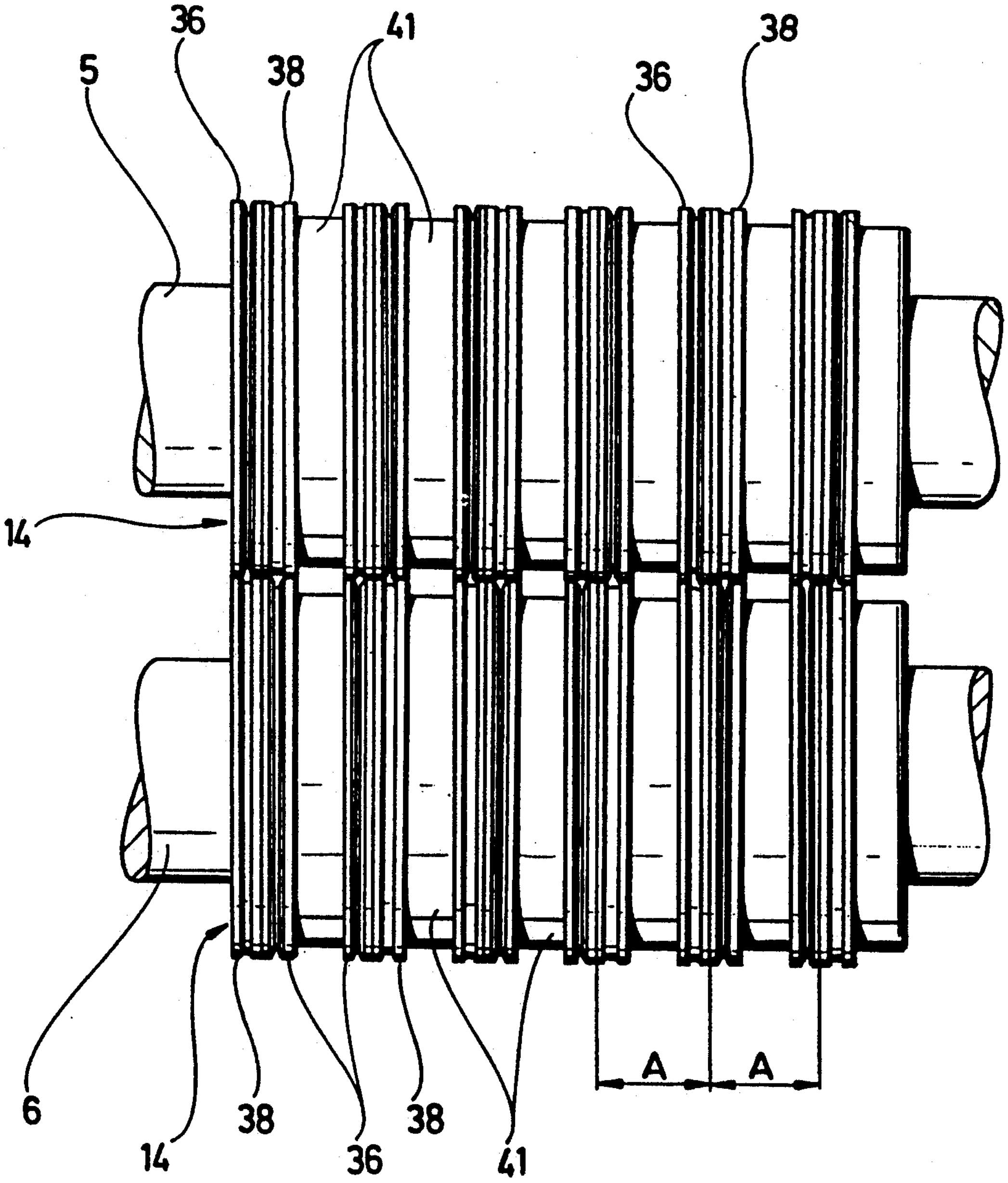
FIG. 8 shows a preferred roller blade arrangement.

As shown, for example, in FIGS. 4, 5 and 6, the hub members 34, 53 and ring members 41, 58 project axially on one side beyond the blade member 36 and lifting ring 38. In this respect, the arrangement of blade member 36 and lifting ring 38 can be optionally such that either the blade member 36 or the lifting ring 38 is adjacent the hub or ring member. In FIG. 8, a total of six roller blades 14 are arranged on both the upper blade shaft 5 and the lower blade shaft 6 so as to be as close together as possible, the respective roller blades 14 hereby abutting on one another. As illustrated, the arrangement on each blade shaft is such that the ring member 41 is alternatingly contiguous to a blade member 36 or a lifting ring 38, whereby on the upper shaft 5 blade member 36 and lifting ring 38 are arranged in the opposite order to that on the lower blade shaft 6. All the ring members 41 are directed in the same direction (to the right). A sheet metal band is divided with the aid of the roller blades each time at the adjacent edges of a lower and an upper blade member 36. In the arrangement illustrated in FIG. 8, an equal, minimum strip width is attainable each time and this is indicated by the measurement A.

Figure 9:
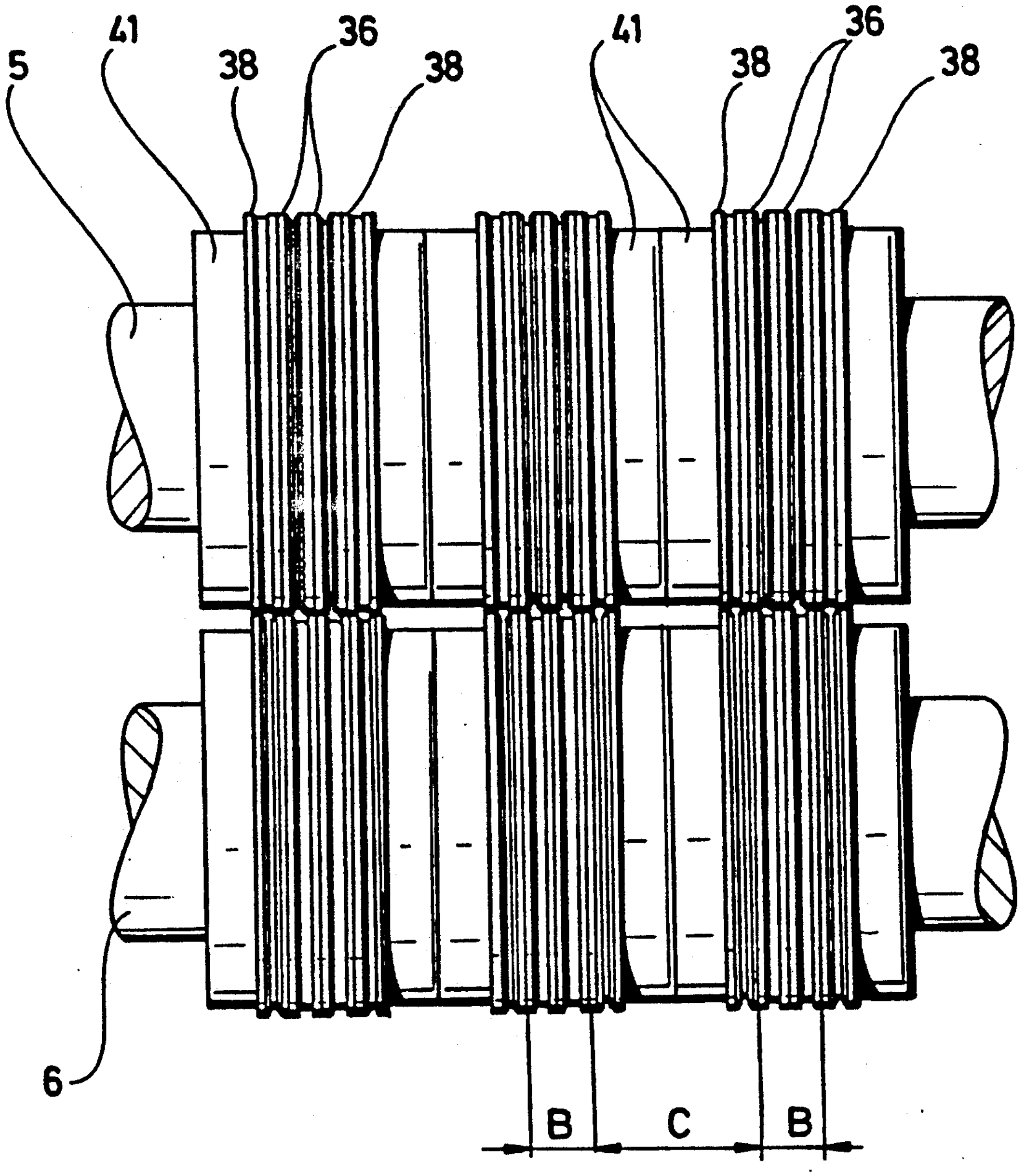
FIG. 9 shows a different, preferred roller blade arrangement.

The roller blade arrangement according to FIG. 9 differs from that of FIG. 8 in that the ring members 41 are alternatingly directed towards different sides. However, in each case lifting rings 38 always follow the ring members 41 on the blade shaft 5 and blade members 36 always follow the ring members on the blade shaft 6. With this arrangement of the roller blades, alternatingly different strip widths result, the measurements of which are specified in FIG. 9 as B and C, respectively. B is smaller than A, C is larger than A. A can, for example, be 73 mm, B 40.5 mm and C 106 mm.

In the embodiment of rotary shears described on the basis of FIGS. 1 and 2, both blade shafts 5, 6 are driven due to the gear wheels 11, 12 acting between them. In principle, it is sufficient for only one of the blade shafts 5 or 6 to be driven. When a piece of sheet metal is inserted between the roller blades, the respective other blade shaft and the roller blades seated thereon are automatically taken along.

As described above, it is possible on the basis of the specified constructional design to position all the roller blades 14 with the aid of the manipulator 15 individually and independently of one another on their blade shafts. Moreover, all the roller blades 14 can be clamped individually and independently of one another on the blade shaft due to the clamping means described, namely, on the one hand, by the eccentric circumferential surfaces 44, 45 and, on the other hand, by the hydraulically operated clamping sleeve 51, the manipulator 15 also being used for this purpose.

The rotary shears described are associated in a manner known per se, which is not therefore expressly illustrated and described, with a programmable computer which controls all the rotary and displacement movements of the parts described, i.e., in particular, of the blade shafts 5, 6, the manipulator 15, the slide 21 and the fingers 25, and in which the respective positions of the roller blades are stored so that optionally selectable positions of the roller blades can be set.

I claim:

1. Rotary shears for dividing sheet metal bands or sheet metal panels into several strips including in combination a machine frame, first and second blade shafts (5,6), means mounting said blade shafts for rotary movement on said machine frame, said blade shaft mounting means comprising means (13) for adjusting the distance between said shafts, a plurality of roller blades (14), means mounting said roller blades (14) directly on said shafts (5,6) for individual and independent movement of each roller blade axially along its associated shaft, actuatable clamping means (34, 41, 48; 53, 58, 64) for individually and independently clamping said roller blades to their associated shafts, one single manipulating means (15) for said roller blades, and means mounting said manipulating means for displacement on the machine frame parallel to the blade shafts for axially positioning the roller blades on their blade shafts, said one single manipulating means (15) comprising first means (21) for shifting the roller blades along their associated shafts and second means (25) for actuating said clamping means, said clamping means comprising a hub member (34; 53) having an outer circumferential surface and being connected to a blade member (36) and mounted non-rotatably but axially displaceably on its blade shaft, said hub member being partially covered on said outer circumferential surface by a ring member (41,58) and so arranged to be clamped against axial displacement on said blade shaft by a relative rotation between said hub member and said ring member and said second means for actuating the clamping means (34, 41, 48; 53, 58, 64) comprising remote controlled movable fingers (25) on said one single manipulating means (15) for locking said ring member (41; 58), so that by rotating the blade shaft (5,6) the hub member (34;53) is rotated relative to the ring member (41;58).

2. Rotary shears as in claim 1 in which said first means for shifting the roller blades comprises two pairs of remotely-controlled oppositely disposed slides (21) associated with the respective shafts (5,6), said pairs of slides adapted positively to engage said roller blades (14) so that said roller blades are axially displaced along their associated blade shafts in response to displacement of said manipulating means.

3. Rotary shears as in claim 1 in which said roller blades (14) are formed with circumferential profiled grooves (23) for receiving said slides (21).

4. Rotary shears as in claim 1 in which said hub member and said ring member having cylindrical surfaces in said covered part of said hub member, said cylindrical surfaces engaging one another and being eccentric to the axis of rotation of the blade shaft (5,6) whereby during the rotation of the hub member (34) relative to the ring member (41) the hub member (34) and the blade member (36) carried thereby are clamped on the blade shaft (5,6) against axial displacement.

5. Rotary shears as in claim 4 in which said ring member (41) is formed with stop surfaces (48) adapted to be engaged by said finger (25) to prevent the ring member (41) from rotating.

6. Rotary shears as in claim 4 in which said one single manipulating means (15) comprises two pairs of remotely-controlled oppositely disposed slides (21) associated with the respective shafts (5,6), said pairs of slides adapted positively to engage said roller blades (14) so that said roller blades are axially displaced along their associated blade shafts in response to displacement of said single manipulating means, and said single manipulating means (15) further comprises a frame enclosing both blade shafts (5,6) on all sides in a ring-like manner, said slides (21) and said fingers (25) being arranged on said frame.

7. Rotary shears as in claim 4 in which each roller blade (14) comprises an elastic lifting ring (38), said hub and ring members (34, 41) protruding axially to one side of and beyond the blade member (36) or the lifting ring (38), said roller blades (14) being arranged on the blade shafts (5,6), such that all the hub and ring members are directed either toward the same side of said blade member or alternatingly toward different sides of said blade member.

8. Rotary shears as defined in claim 1 in which each roller blade (14) comprises a clamping sleeve (51) having an inner circumferential surface, means connecting said clamping sleeve to said hub member for rotation therewith at said inner circumferential surface thereof between the blade shaft (5,6) and the hub member, means forming a sealed annular space (54) for a hydraulic medium between the clamping sleeve (51) and the hub member (53), said clamping sleeve (51) and with it the hub member (53) being clampable on the blade shaft (5,6) under the action of said hydraulic medium, said hub member (53) being formed with an essentially radial cylinder bore (62) communicating with said annular space (54), a piston (63) displaceable in said bore, said piston having a piston head protruding beyond the outer circumferential surface of the hub member (53), said ring member (58) having an inner circumferential surface covering the outer circumferential surface of said hub member (53), said inner circumferential surface extending eccentrically with respect to the axis of rotation of the blade shaft (5,6) and the head of the piston (63) abutting on said eccentric surface so that when the hub member (53) is rotated relative to the ring member (58) the piston (63) is displaced in the cylinder bore (62) and the pressure of the hydraulic medium is altered thereby.

9. Rotary shears as in claim 8 in which said ring member (58) is formed with stop surfaces (64) adapted to be engaged by said finger (25) to prevent the ring member (58) from rotating.

10. Rotary shears as in claim 8 in which said manipulating means (15) comprises two pairs of remotely-controlled oppositely disposed slides (21) associated with the respective shafts (5,6), said pairs of slides adapted positively to engage said roller blades (14) so that said roller blades are axially displaced along their associated blade shafts in response to displacement of said manipulating means, and said manipulating means further comprises a frame embracing both blade shafts (5,6) on all sides in a ring-like manner, said slides (21) and said fingers (25) being arranged on said frame.

11. Rotary shears as defined in claim 8 in which each roller blade (14) comprises an elastic lifting ring (38), said hub and ring members (53,58) protruding axially to one side beyond the blade member (36) or the lifting ring (38), said roller blades (14) being arranged on the blade shaft (5,6) such that all the hub and ring members are directed either toward the same side or alternatingly toward different sides.

* * * * *

UNITED STATES PATENT AND TRADEMARK OFFICE
CERTIFICATE OF CORRECTION

PATENT NO. : 5,297,464
DATED : March 29, 1994
INVENTOR(S) : Adolf Mayer

It is certified that error appears in the above-identified patent and that said Letters Patent is hereby corrected as shown below:

Column 7, line 59 - "claim 1" should read -- claim 2 --.

Signed and Sealed this

Twelfth Day of July, 1994

Attest:

BRUCE LEHMAN

*Attesting Officer* *Commissioner of Patents and Trademarks*